Figure 1:
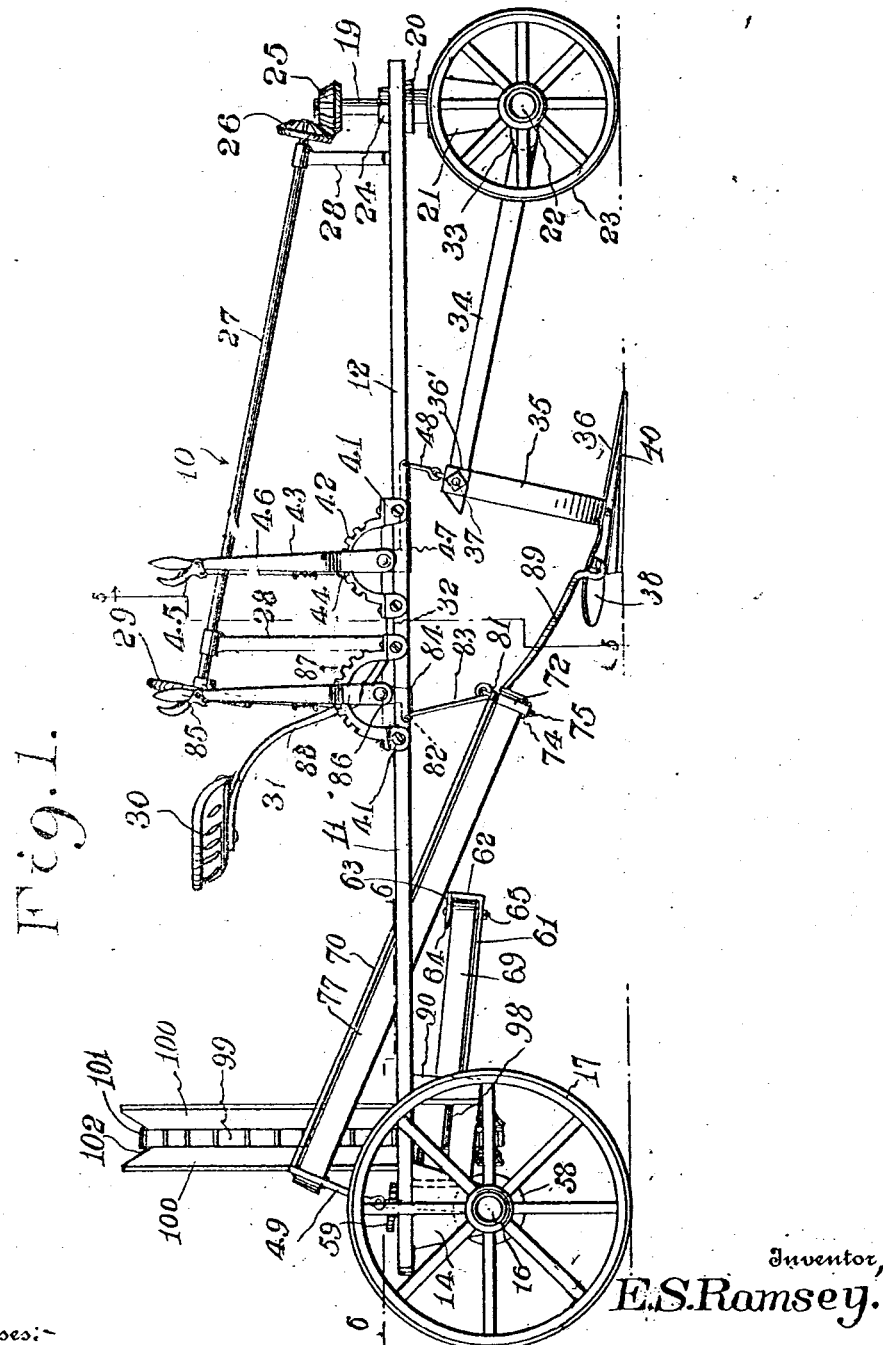

E. S. RAMSEY.
BEET HARVESTER.
APPLICATION FILED MAY 1, 1912.

1,075,440.

Patented Oct. 14, 1913
6 SHEETS—SHEET 1.

Witnesses:

Inventor,
E. S. Ramsey.
By
Attorneys

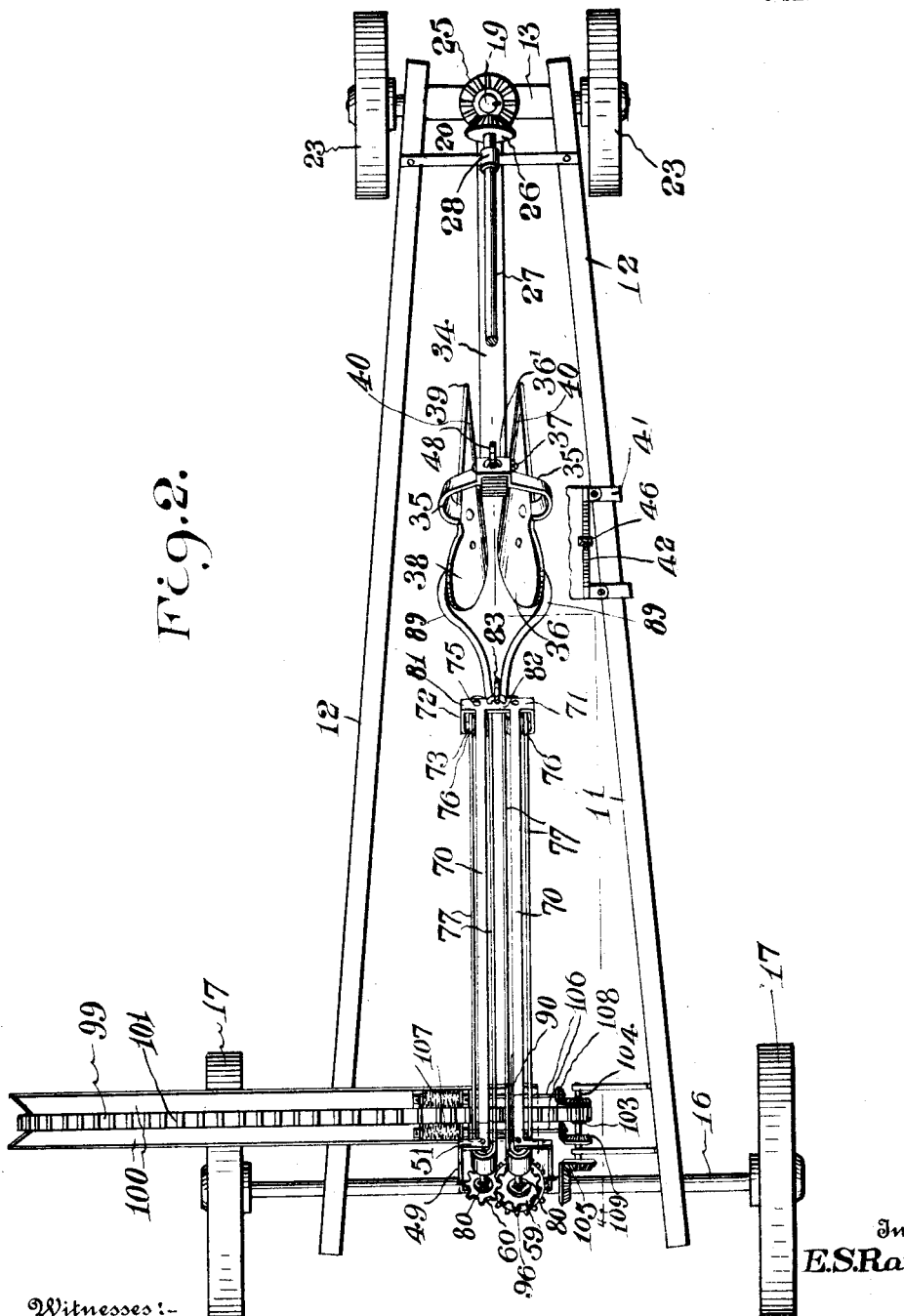

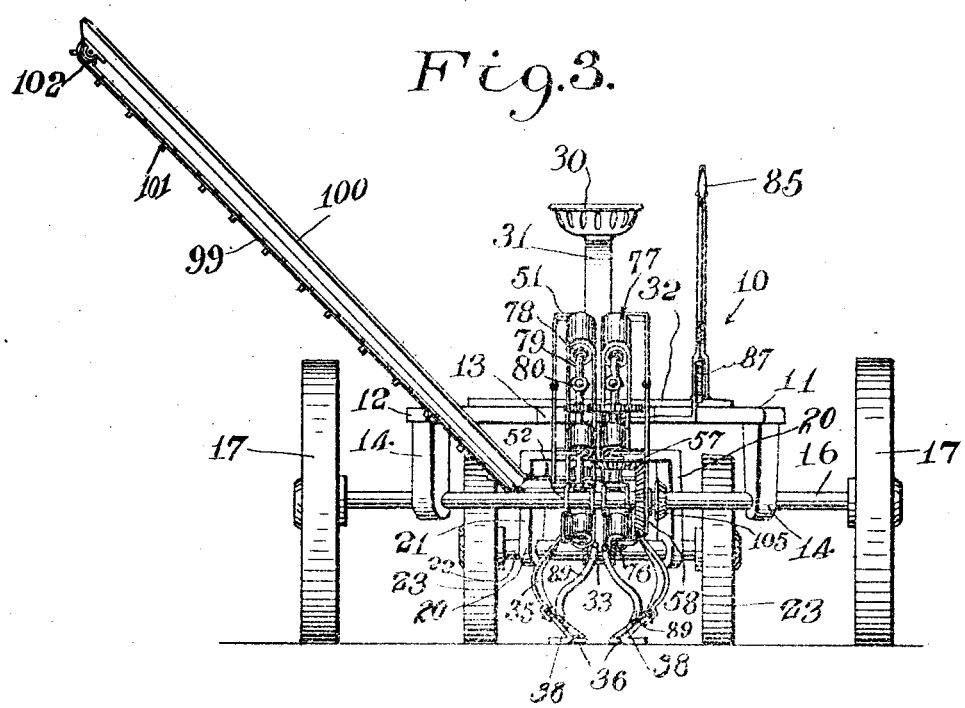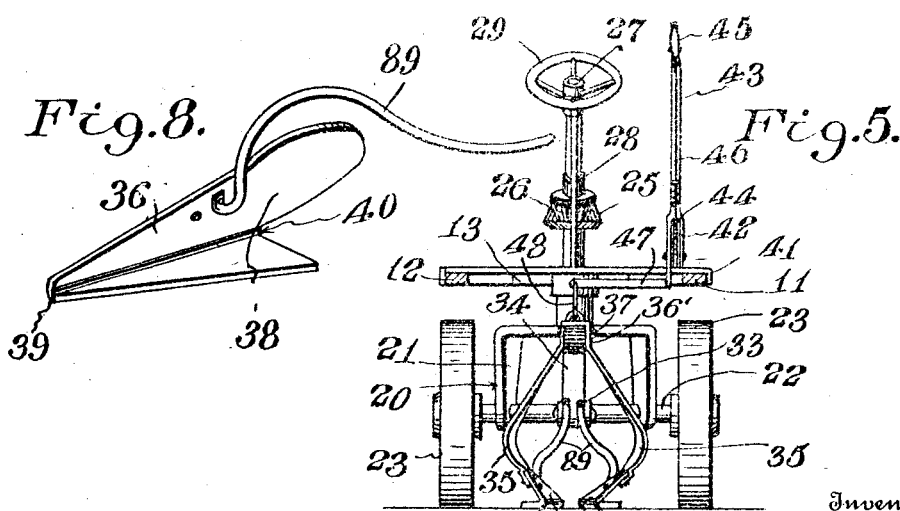

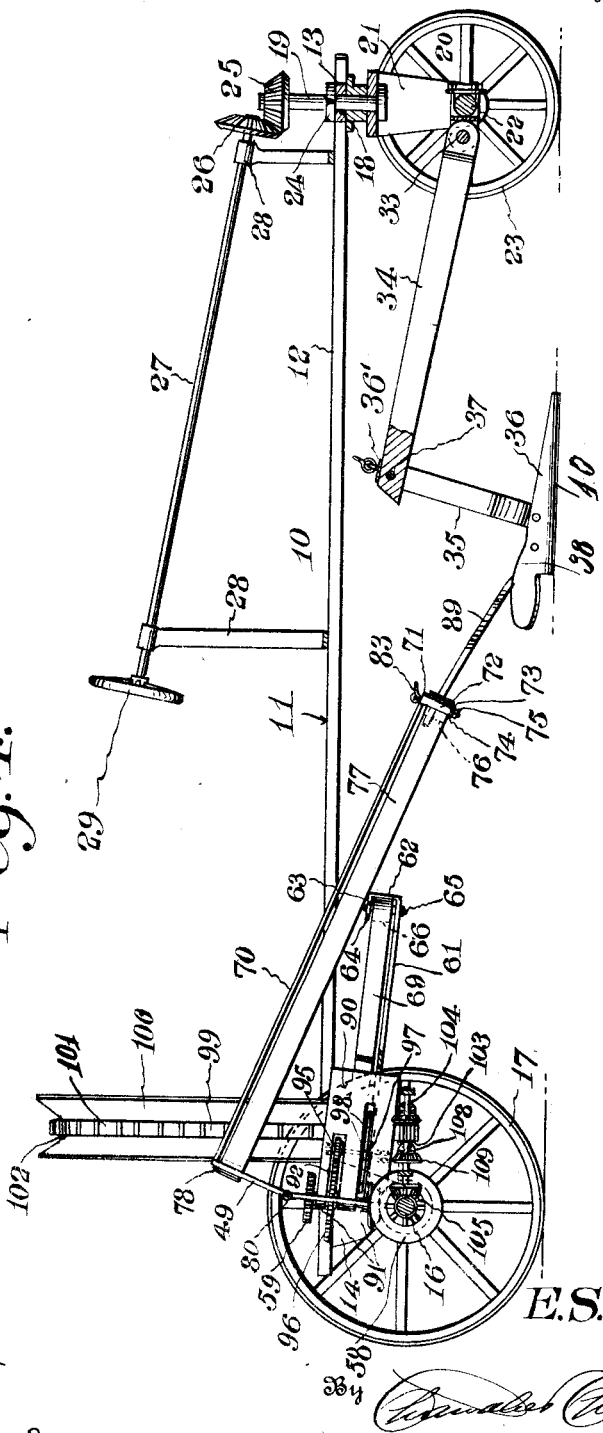

E. S. RAMSEY.
BEET HARVESTER.
APPLICATION FILED MAY 1, 1912.
1,075,440.
Patented Oct. 14, 1913.
5 SHEETS—SHEET 5
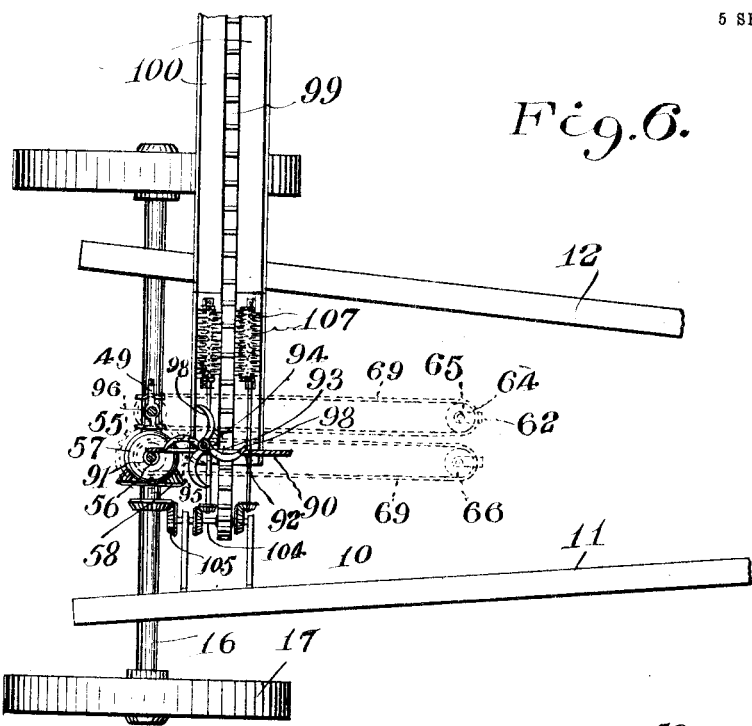
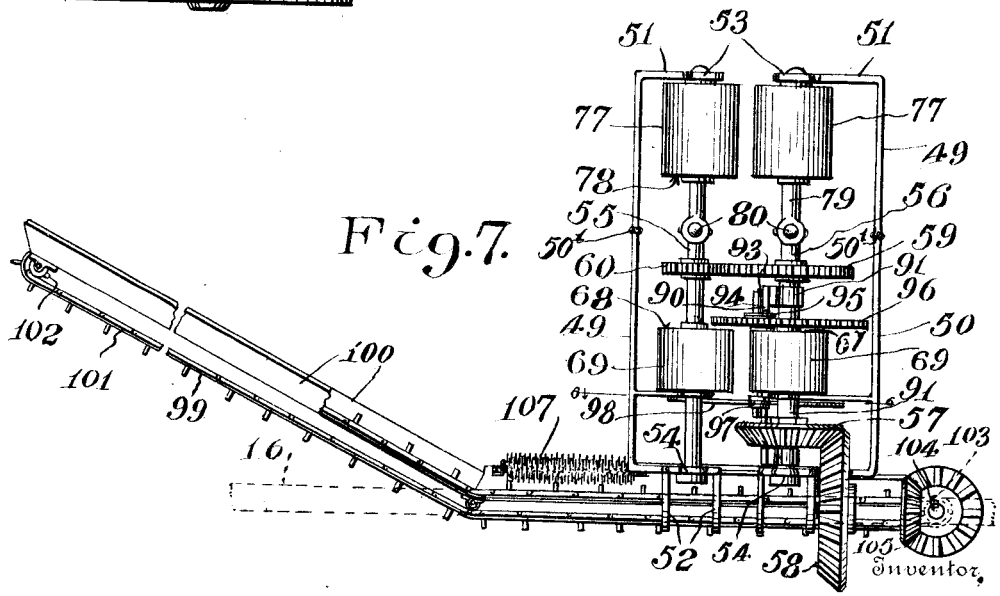
Witnesses—
Inventor,
E. S. Ramsey.
By
Attorneys

UNITED STATES PATENT OFFICE.

EDWARD S. RAMSEY, OF CHANCE, MONTANA.

BEET-HARVESTER.

1,075,440.

Specification of Letters Patent. Patented Oct. 14, 1913.

Application filed May 1, 1912. Serial No. 694,387.

*To all whom it may concern:*

Be it known that I, EDWARD S. RAMSEY, a citizen of the United States, residing at Chance, in the county of Carbon, State of Montana, have invented certain new and useful Improvements in Beet-Harvesters; and I do hereby declare the following to be a full, clear, and exact description of the invention, such as will enable others skilled in the art to which it appertains to make and use the same.

This invention relates to new and useful improvements in harvesters and more particularly to that class adapted to be used for the purpose of harvesting beets or vegetables of like nature.

An object of this invention is the provision of a harvester for beets or the like which is of such construction that it will remove the beets from the earth, severing the tops from the beets and convey the beets into a suitable receptacle.

Another object of this invention is the provision of a beet harvester having a pair of novelly constructed plow shares adjustable thereon for the purpose of removing the beets from the ground and a plurality of endless conveyers engaging said shares for the purpose of conveying the beets to a suitable knife which is adapted to sever the tops therefrom allowing said beets to fall into an elevator by the means of which the beets will be transported to a suitable receptacle.

A further object of this invention is to produce a beet harvesting machine which employs the use of two pairs of endless conveyers arranged in angular relation with respect to each other, the said conveyers adapted to hold the beets in such position that the tops may be very readily severed therefrom by the use of a suitable knife operated by the movement of the machine.

A still further object of this invention is the provision of a beet harvester which will be comparatively simple and inexpensive to manufacture, reliable and efficient in use and readily operated.

With the above and other objects in view this invention resides in the novel features of construction, formations, combinations and arrangements of parts to be hereinafter more fully described, claimed and illustrated in the accompanying drawings, in which:—

Figure 1 is a side elevation of my improved beet harvester. Fig. 2 is a top plan view thereof. Fig. 3 is a rear end elevation. Fig. 4 is a longitudinal sectional view taken on the line 4—4 of Fig. 2. Fig. 5 is a transverse sectional view taken on the line 5—5 of Fig. 1. Fig. 6 is a detail view, partly in top plan and partly in section, of the rear portion of the machine showing the topping knife, the elevator and cleaning brushes, and driving gearing therefor. Fig. 7 is an enlarged fragmentary side elevation of the rear end of my improved harvester. Fig. 8 is a detailed perspective view of one of the plow shares.

Referring to the accompanying drawings throughout the several views by similar characters of reference, the numeral 10 designates generally my improved harvester which comprises a substantially triangular horizontally disposed frame 11, consisting of forwardly converging side beams 12 connected at their forward ends by a cross bar 13 and provided at their rear extremities with depending journal boxes 14 which support rotatably therein the opposite ends of a rear axle 16, to the terminals of which are keyed traction wheels 17 arranged upon the outside of the side bars 12 of the frame 11.

The cross beam 13 is centrally apertured as indicated by the numeral 18 for the reception of a vertically extending king bolt 19, to the lower end of which is fixed a front truck 20 comprising a U-shaped supporting member 21 having journaled in its depending ends an axle 22 to the terminals of which are rotatably secured the front or guide wheels 23.

The king bolt 19 is held against displacement by suitable locking nuts 24, while the upper end thereof has keyed thereto a beveled pinion 25 which meshes with a similar pinion 26 carried by the forward end of a steering rod 27 journaled in suitable bearings 28 carried by the frame 11 and provided upon its opposite end with a steering wheel 29 located within the convenient reach of the operator who may sit upon the seat 30 mounted upon a spring standard 31 secured to a cross beam 32 fastened at its opposite ends to the converging side members 12. The front truck 20 has pivotally mounted at its medial point as at 33 a plow beam 34, to the rear end of which is secured a spring supporting member 35 provided with a reduced intermediate portion 36' surrounding the end of the beam 34 and held against displacement by a locking bolt 37. The ends of the member 35 have the plow shares 36 removably connected therewith, these shares being flared outwardly as indicated by the numeral 38 and terminating in downwardly curved points 39 adapted to enter the ground upon each side of the rows of beets, obviously digging the same from the ground and causing them to be forced upon the upper faces of the said shares 36. The inner edges of these shares 36 are bent upon themselves as at 40 to produce rounded edges which prevent cutting or injury to the beets.

An inverted U-shaped supporting member 41 connects the intermediate portions of the side members 12 and supports thereon a toothed segment 42, to the central portion of which is pivoted an operating lever 43. This lever is held against displacement by a locking dog 44 which engages the teeth of the segment 42 and may be thrown into and out of engagement therefrom by a hand lever 45 pivoted to the upper end of the said lever 43 and connected to the pawl or dog 44 by means of a link 46. The lower terminal of this lever 43 is provided with a forwardly extending arm 47 connected at its terminal to the beam 34 by means of a link 48. Obviously upon the proper manipulation of the lever 43 the plow beam 34 will be raised or lowered, thereby changing the elevation of the shares 36 with respect to the ground. A swinging frame 49, comprising a pair of spaced parallel side rods 50 formed of hinged sections which terminate at their upper ends in the transverse extensions 51 and provided at their lower ends with eyes 52 loosely surrounding the axle 16, is secured to the intermediate portion of the said axle and is provided with suitable bearings 53 and 54 at its upper and lower ends, respectively, in which bearings are rotatably journaled vertically extending parallel shafts 55 and 56. The shaft 56 is provided adjacent its lower end with a beveled pinion 57 meshing with a beveled pinion 58 keyed to the axle 16, thereby providing a means whereby the shafts 55 and 56 will be rotated upon the movement of the machine caused by the rigid connection between the axle 16 and the traction wheels 17.

The intermediate portion of the shaft 56 has keyed thereon a gear wheel 59 engaging teeth of a pinion 60 carried by the shaft 55 for the purpose of transmitting motion to the said shaft 55 and causing the same to rotate in a direction opposite to that of the shaft 56. The lower end of the side members 50 of the swinging frame 49 has extending therefrom substantially horizontally disposed rods 61 the free terminals of which are bent upwardly as at 62 and then back upon themselves as at 63 to form bearings 64 for the reception of supporting bolts 65 upon which are rotatably held rollers 66. The lower ends of the shafts 55 and 56 have keyed thereon above the axle 16 pulleys or rollers 67 and 68 over which and over the rollers 66 are extended endless conveyer belts 69. The upper ends of the sides 50 of the frame 49 have extending therefrom downwardly slanting rods 70, the terminals of which are offset laterally as at 71 and then bent downwardly as at 72 from which points they are extended inwardly as at 73 terminating in bearings 74 in which bearings and in bearings formed at the juncture of the rods 70 and the lateral extension 71 are journaled supporting bolts 75 upon which are rotatably located rollers or pulleys 76. Endless conveyer belts 77 pass around the pulleys 76 and around pulleys 78, which latter are carried by the extension shafts 79. These extension shafts 79 each have a swivel connection 80 with the upper end of the adjacent one of the shafts 55—56, and the upper ends of these extension shafts are journaled in the bearings 53 of the lateral end portions 51 of the side rods of the frame 49. The free ends of the rods 70 are connected by a suitable bar 81 provided with an eye 82 for engagement with a connecting link 83 which unites the said eye 82 with the offset arm 84 of a vertically extending operating lever 85 fulcrumed as indicated by the numeral 86 to a toothed segment 87 carried by the before mentioned supporting cross bar 41. This lever is held in rigid engagement with the segment by means of a locking pawl 88 operated in an identical manner to the before mentioned pawl 44.

Obviously upon the proper manipulation of the lever 85 the bars 70 will be tilted to any desired angle which will assist in causing the conveyer belts 77 to engage the beet tops. A pair of guide rods 89 are secured to the shares 36 and extend between the belts 77 and the depending portions 72 of the rods 70 serving to engage the tops of the beets as they are being removed from the ground and guide the tops between the belts 77.

A plate 90 is secured at one end thereof, as indicated by 91 to the shaft 56, the said plate being provided with suitable slots 92, through which work the pinion 95, gear 96 and cutter blade 98, hereinafter mentioned. A shaft 93 is journaled at its opposite ends in bearings 94 formed upon said plate 90 and has keyed to its upper end a pinion 95 which meshes with a gear wheel 96 keyed to the shaft 56 for the purpose of causing the shaft 93 to rotate upon the movement of the machine.

The shaft 93 has keyed to one end thereof adjacent the lower edge of the belts 69 a hub 97 from which extend a plurality of radially projecting knife blades 98 adapted upon the rotation of the shaft 93 to sever the beet tops from the beets as they are drawn between the belts 69. The plate 90 in this operation serves to prevent any lateral swinging of the beets which might serve to cause their displacement as the knife blades 98 are rotated. The tops of the beets will be carried by the belts 69 to the rear of the machine and dropped in the ground while the beets are permitted to fall upon an endless elevator 99 which consists of inwardly converging guide plates 100, between which is mounted a conveyer chain 101 supported at its opposite ends by suitable sprockets 102 and 103, the latter of which receives a rotary movement from its axle 104 which is geared as indicated by the numeral 105 to the axle 16 of the machine.

The guide plates 100 have journaled upon their upper faces adjacent the lower ends thereof parallel shafts 106 which carry keyed to their upper terminals cleaning brushes 107 for engagement with the beets as they are moved upwardly along the conveyer, thereby brushing any dirt or the like from the same. The lower ends of the shafts 106 have keyed thereto beveled pinions 108 meshing with beveled pinions 109 fixed to the shaft 104 in any suitable manner which will cause their rotation upon the rotation of the said shaft or axle.

It will be apparent from an inspection of the drawings that the conveyer belts 69 extend between the inner sides of the conveyer belts 77 and manifestly as the machine is propelled along the ground by any suitable power the beets will be removed from the ground by means of the shares 36 and guided in the direction of the conveyer belts 77, which belts engage the tops of the beets and cause them to be moved rearwardly and upwardly into engagement with the conveyer belts 69. The tops of the beets are still held between the conveyer belts 77 which obviously forces the upper ends of the beets into contact with the lower edges of the belts 69. This engagement prevents any further upward movement of the beets which are then conveyed in the path of the rotating knife blades 98 which sever the tops of the beets from the bodies thereof permitting said tops to pass through the belts and drop at the rear of the machine and causing the beets to fall upon the elevator from which they will be deposited in a suitable receptacle.

The foregoing disclosures illustrate one embodiment of my invention, but it is to be understood that minor variations in the details of construction may be resorted to without departing from or sacrificing any of the advantages of the invention.

From the foregoing disclosures taken in connection with the accompanying drawings, it will be manifest that a beet harvesting machine is provided for which will fulfil all of the necessary requirements of the device.

Having thus particularly described this invention, what I claim as new and desire to obtain by Letters Patent, is:

1. In a beet harvesting machine, the combination with a frame, a driven axle supported by the frame, plow members, a frame secured to the driven axle, conveyer belts supported in the last mentioned frame, means connecting the conveyer belts with the axle for rotating such belts, guides extending between the forward end of one of the conveyer belts and the plow members, and a cutter located adjacent the other conveyer belt for severing the beet tops.

2. In a beet harvesting machine, the combination with a frame including a wheeled axle, a swinging frame carried by the wheeled axle, shafts journaled in the swinging frame, means rotatably connecting the shafts with the axle, a plurality of conveyer belts mounted in the swinging frame and operated by the shafts, one of said belts being located below the other and at an angle thereto, and a beet topping knife located beneath the belts for severing the beet tops and releasing the beets from the conveyer belts.

3. In a beet harvester, the combination with a frame, a wheeled axle for the frame, a plow, beet guides carried by the plow, a swinging frame carried by the axle, conveyer belts mounted upon the swinging frame and rotatably connected to said axle, one pair of said belts being arranged at an angle to the other pair of belts, a cutter located adjacent one pair of the belts for severing the beet tops and permitting the release of the beets from the belts.

4. In a beet harvester, the combination of a frame, a plow carried thereby, a swinging frame, pairs of conveyer belts carried by the swinging frame, one of said pairs of belts being arranged at an angle to the other pair, whereby the beets lifted by one pair of belts will be transferred to the other pair of belts, and means rotatably connecting the belts with the axle.

5. In a beet harvester, the combination with a frame, of a pair of plows therefor, guides carried by the plows, an inclined belt conveyer for receiving the beets from the guides, a second belt conveyer arranged beneath the first mentioned conveyer and at an angle thereto, means for driving the conveyer belts, a beet top cutter adjacent the lower conveyer and adapted to sever the beet tops and release the beets from the conveyer and an elevator for receiving the released beets.

In testimony whereof, I affix my signature, in presence of two witnesses.

EDWARD S. RAMSEY.

Witnesses:
 FRANK GOLDSMITH,
 C. D. BERRY.